United States Patent

Knepper et al.

[11] Patent Number: 5,113,191
[45] Date of Patent: May 12, 1992

[54] RADAR SIGNAL PROCESSING

[75] Inventors: Udo Knepper, Langenargen; Franz Lutz, Friedrichshafen; Viktor Beyer, Tettnang, all of Fed. Rep. of Germany

[73] Assignee: Dornier GmbH, Fed. Rep. of Germany

[21] Appl. No.: 624,547

[22] Filed: Dec. 10, 1990

[30] Foreign Application Priority Data

Dec. 9, 1989 [DE] Fed. Rep. of Germany ....... 3940805

[51] Int. Cl.⁵ .................. G01S 13/50; G01S 13/56; G01S 7/285
[52] U.S. Cl. .................................. 342/119; 342/28; 342/194
[58] Field of Search .................. 342/119, 60, 194, 195, 342/68, 28, 58; 364/423

[56] References Cited

U.S. PATENT DOCUMENTS

| | | |
|---|---|---|
| 2,992,422 | 7/1961 | Hayes, Jr. ............................ 342/119 |
| 3,012,242 | 12/1961 | Machlis et al. ...................... 342/119 |
| 3,068,470 | 12/1962 | Werner et al. ...................... 342/119 |
| 3,155,971 | 11/1964 | Hansel .................................. 342/58 |
| 3,351,943 | 11/1967 | Bush et al. ........................... 342/352 |
| 3,380,051 | 4/1968 | Cartwright ........................... 342/58 |
| 3,495,243 | 2/1970 | Russell ................................ 342/119 |
| 3,710,386 | 1/1973 | Darboven et al. .................... 342/99 |
| 3,878,526 | 4/1975 | Pedersen ............................. 342/194 |
| 4,005,420 | 1/1977 | McDonald ............................ 342/84 |
| 4,031,534 | 6/1977 | Kallmann et al. ..................... 342/58 |
| 4,057,708 | 11/1977 | Greeley et al. ..................... 342/58 X |
| 4,083,049 | 4/1978 | Mattern et al. ...................... 342/28 |
| 4,091,367 | 5/1978 | Harman ............................... 342/27 X |
| 4,499,467 | 2/1985 | Rittenbach ........................... 342/109 |
| 4,647,874 | 3/1987 | Rittenbach ........................... 342/99 |
| 4,733,238 | 3/1988 | Fiden .................................... 342/60 |
| 4,739,329 | 4/1988 | Ward et al. .......................... 342/119 |
| 4,803,631 | 2/1989 | Newman .......................... 342/119 X |
| 4,812,849 | 3/1989 | Otto ..................................... 342/194 |

Primary Examiner—John B. Sotomayor
Attorney, Agent, or Firm—R. H. Siegemund

[57] ABSTRACT

A sensing circuit is assumed to produce in phase and quadrature Doppler signals. The relative phase of these signals is used to determine the passage of object such that correctly related zero passages in the two signals are counted, and the count state within certain periods of time yields information to check the significance of signals as genuine Doppler signals.

5 Claims, 5 Drawing Sheets

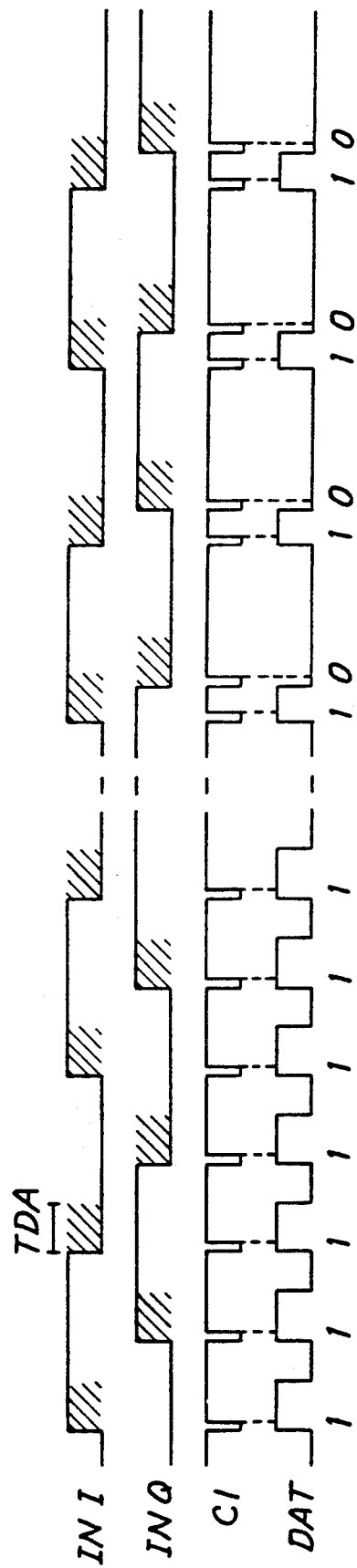
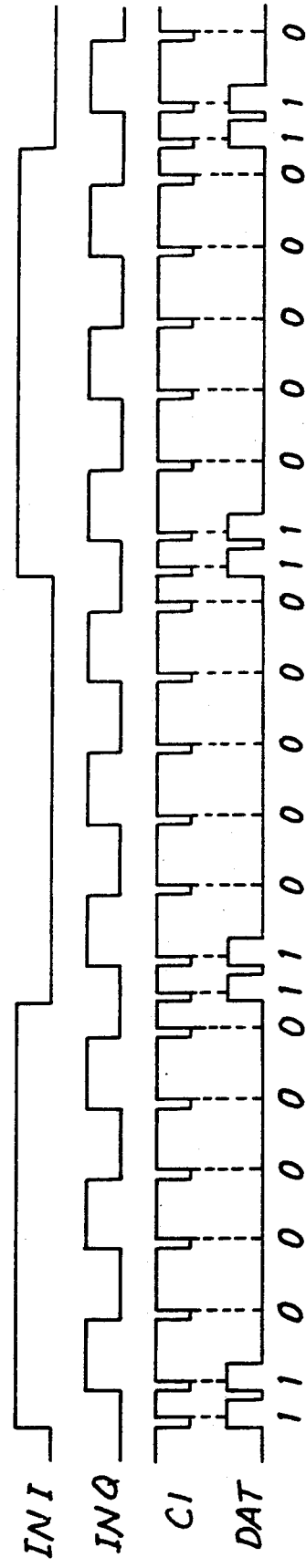

RADAR SIGNAL PROCESSING

BACKGROUND OF THE INVENTION

The present invention relates to the signal processing within, radar and sonar or an ultrasonar equipment and more particularly the invention relates to the signal processing of radar ultrasonic or sonic pulses which have responded to an object as the equipment has approached that object to a particular distance (or vice versa) under utilization of in phase and quadrature phase features of a Doppler signal.

It is known to use dragged vehicles (drones) to represent air targets. This kind of equipment is used for training exercises or the like. The dragged target or drone is equipped with e.g. radar which responds to the passing of projectiles that is to projectiles passing the target at a particular distance. A particular sensitive target zone may for example be defined by a hypothetical body having a distance between 1.5 and 10 m from the target or one can say that the sensitive zone is a sphere of a radius having that dimension around the center of the target. The on board system here is comprised of the radar front end with a omnidirecitonal transmitter and receiver antenna; at least omnidirectionality is desired as far as and to the utmost extent possible, and further included are signal processor and a telemetric transmitter to transmit to the ground coded information concerning hits or miss and by how much.

U.S. Pat. No. 3,878,526 describes a radar evaluating circuit wherein diffentiation is provided for the in phase or I signal, and the quadrature or Q signal and the differentiated signal is multiplied with the respective other undifferentiated signal, and the sum of these products is integrated in order to provide and extract a signal that is representative of the target motion.

U.S. Pat. No. 4,499,467 describes another analogous radar signal processing stage wherein in phase or I signal and quadrature or Q signals are processed through phase shifting elements. Generally it has to be said that the acquisition characteristics is of spherical configuration with rather sharp outer boundaries which results from the fact that the transmitter pulse being only a few nanoseconds wide is on return acceptable only beyond a certain signal gate timing, assuming furthermore that the transmitter signal is truly omnidirectional.

In the case of a hit signal pursuant to a passage of a projectile through the acquisition characteristics three conditions have to be met simultanesously. First the approach speed, that is the relative speed between the projectile and the antenna, center, i.e. the center of gravity of the antenna, must be within particular upper and lower limits. Second, the projectile's trajectory within the acquisition characteristics is equal to or larger than a predetermined minimum path lengths. Thirdly, the echo amplitude of the projectile exceeds a particular threshold value, applicable to the minimum path length.

The extraction of the signal parameters needed to obtain the hit/miss differentiation and using the raw Doppler signal poses the following problems. The raw signal of course appears superimposed with noise resulting from the physically vibrating parts of the dragged target. This is also known as radar microphony. Any on-board, real time signal processing is essential simply because one cannot transmit raw data in its entirety for reasons of practical constraints posed by the capacity of telemetric equipment. Extensive and expensive filter methods such as FFT filters and/or Doppler filter banks are too expensive. Because the equipment must be relatively cost effective owing to the possibly frequent loss. The failure rate and incorrect alarm rate of automatic hit detection must in fact be zero; in other words it is simply unacceptable to have incorrect hit/miss rate distinction.

DESCRIPTION OF THE INVENTION

It is an object of the present invention to provide a new and improved radar or generally range finding methods as far as signal processing is concerned which is economical, operates in real time and has a low failure and miss rate.

It is a particular object of the present invention to provide a new and improved signal evaluating circuit for application in radar equipment, sonar and ultrasonic echo or sounding equipment which responds in some fashion to the presence of objects having a certain distance from the equipment under particular utilization of in phase as well as quadrature phase processing of the doppler signal.

In accordance with the preferred embodiment of the present invention, two channels so called I and Q channels are provided wherein one includes a low pass filter and the other a high pass filter whereby the limit frequency of the low pass filter is below the limit of the high pass filter as far as the spectral range of the Doppler signal is concerned, and the characteristic phase position between the filter signals in I and Q channels are used for evaluation whereby under utilization of 90 degrees phase shifts the number of correct phase changes in the I and Q zero passages is counted in relation to a particular number of overall zero passages, and the count is used as hit/miss criterium.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 2 and 3 are diagrams for signals as they occur in the circuit of FIG. 1; particularly on the input and output of a component called CL-DAT;

Proceeding now to the detailed description of the drawings, FIG. 1 illustrates the block diagram with input signals I vector which is the in phase signal and the Q vector which is the quadrature phase signal. Both are Doppler radar signal and are produced as ic conventional. Owing to the employment of two selection criteria the circuit has in effect two branches. The branch above is the phase evaluation branch, the one below is the amplitude evaluation branch under utilization of envelope detection.

The phase evaluation branch for the I channel includes an amplifier at the input AI having its output connected to a bandpass filter BPI which in turn feeds a low pass filter TP with a limit frequency of 150 cps and a zero passage detector NDI (squaring circuit). The phase detector for the Q channel includes an amplifier AQ and also a bandpass filter BPQ. Both bandpass filters operate in a 1 to 15 kHz range. The bandpass filter of the Q channel feeds a high pass filter HP with 100 kHz limit frequency and the output of the latter feeds a zero detector NDQ.

Figure 4:
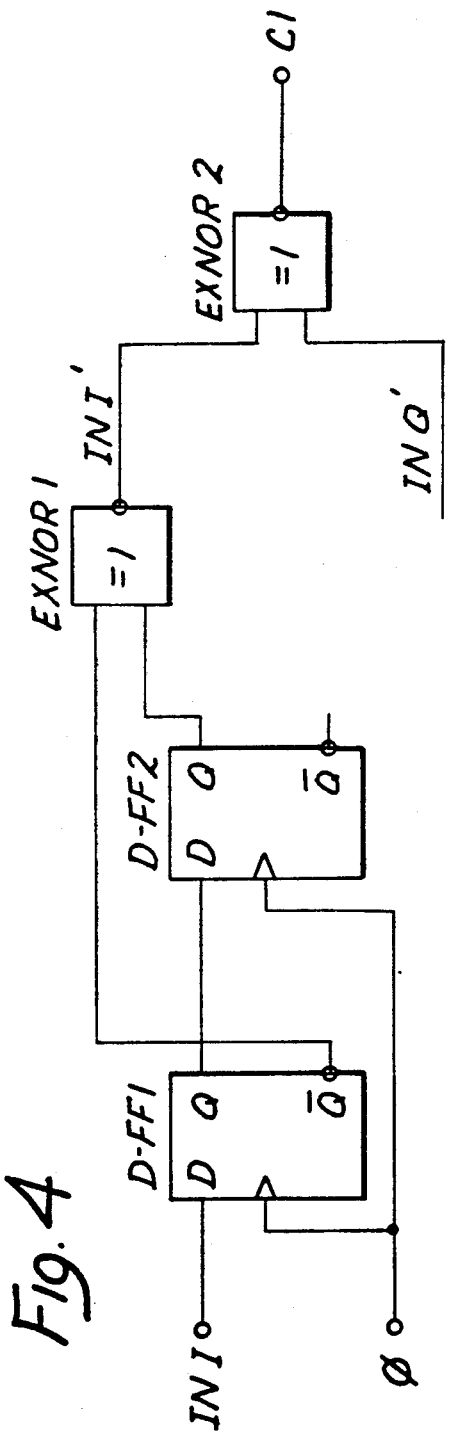
FIG. 4 is a particular circuit diagram, for the production of the CI in the components CL-DAT in FIG. 1.

The two branches feed respectively InI and InQ inputs for a circuit described as CL-Dat details of which are shown in greater detail in FIG. 4 etc. The outputs of the circuit CL-Dat is a clock signal and a data output Dat both of them are fed into shift register SR with n+1 Qo to Qn outputs. These output channels are passed to the evaluating circuit EV shown in greater detail in FIG. 8. The output of this circuit EV is fed to one input of an AND whose output registers hits or misses.

Figure 1:
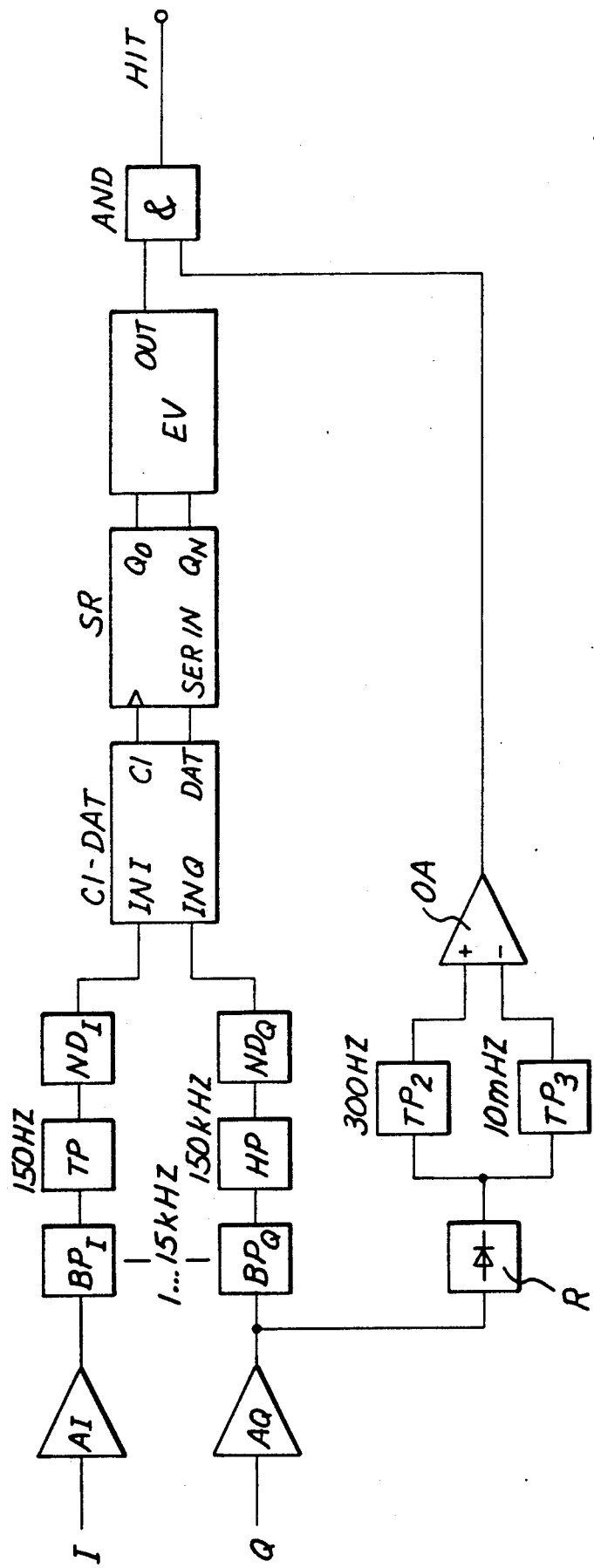
FIG. 1 is a block diagram of an evaluating circuit for carrying out preferred method for practicing the invention under utilization of digital technology and observaton of certain noise amplitudes.

Turning now to the lower portion of the diagram in FIG. 1, the amplitude branch includes the output signal from the amplifier AQ i.e. it pertains to the Q vector and channel. A rectifier circuit R provides rectified output of the amplifier AQ output and thus function as envelope detector. The variable amplitude dc output signal is passed to a low pass filter TP2 with a 300 Hz limit and will pass events of a short duration such as hits. The low pass filter tp3 with a limit frequency of 10 mHz blocks off the hit signals since it has a large time constant and thus suppresses events of short duration. In fact the filter TP3 provides an averaging signal for rectified noise. An operational amplifier OA compares the two filter outputs of the filters TP2 and TP3, and the output of that amplifier provides the second input for the AND gate mentioned above. The operational amplifier in fact determines whether there is a sufficient level difference between the two low pass filter signals as far as this second selection criteria is concerned. If that difference is significant it is fed to the AND gate as a gate open signal so that a concurrency of the phase signal from the EV circuit and a sufficient amplitude signal from OA is indicative of a hit.

After having described the overall layout of the circuit it operates as follows. In accordance with the invention and as was mentioned the I vecotr and Q verctor fo the radar doppler signal is used. It is emphased that for purposes of practicing the invention the production of these signals is not important. This means that regular electromagnetic radar, optical radar, sonar or ultrasonic range finding methods can be used. In other words the particular phenomenon involved that produces these doppler signals is of no particular importance. The circuit simply responds to these I and Q verctor signals which are produced independent from the physical phenomenon involved in the range finding method.

In effect then what FIG. 1 shows are two channels represented by amplifier outputs AI and AQ, and are subjected here to 80 dB amplification. Both signals are bandpass filtered in the BPIQ and circuits and so that only those portions are being processed which concerns a limited range as far as the approach speed of the projectile in relation to the radar sensor is concerned. Following this filtering the two channels are pass filters differently that means the I channel is low pass and the Q is high pass filtered while the respective corner frequencies are outside of the spectral range of the doppler signal. For example, the spectral range of the doppler signal is equal to the passage range of the bandpass which is from 1 kHz to 15 kHz. The RC low pass TPI output has the limit frequency of 150 Hz as already mentioned and the RC high pass HP in the Q channel has a 150 kHz limit. This means that there is a near constant phase shift of 90 degrees in the entire useful range whereby there is a drop in the I channel or increase in the Q channel of 6 dB per octave. The inherent deterioration of the signal to noise ratio is in fact acceptable owing to a lower error alarm rate. This is so because the high pass low pass filtering provides a shift in the center frequency of the eliminated noise bands as between I and Q. This will be described more fully below.

Following the zero passage detection by the two detectors NDI and NDQ, digital evlauation obtains as far as the phase relation between the I and Q channel is concerned. This is carried out in the CL-Dat circuit under utilization of the shift register SR. The serial inputting of signals into the shift register under utilization of signal CL and DAT produced by the CL-DAT circuit follows the following rule. On each change in the I channel or in the Q channel, which is a change in the input INI or INQ channel, a particular data signal is shifted in the register SR. If a signal change obtains in a channel within in a particular period of time tdA, as shown in FIG. 2 following the last change in the signal in the other channel, then a phase relation of phi =90 degrees is regarded as having been violated and a DAT="0" is inputted. Otherwise the data is 1. If a second signal change obtains in a channel without prior signal change in the respective other channel then for this and every following signal, the phase change is interpreted as "0".

A hit is recognized where a particular number such as m obtains in that m out of n storage cells in the shift register SR hold a Dat=1.

For a recognized Doppler period four storage cells are occupied in the shift register SR. The doppler period corresponds to a change in distance between projectile and sensor by half of wavelength of the radar pulse. The number of storage cells in the shift register SR therefore determines the size of the distance change that can be registered by the projectile sensor.

FIGS. 2 and 3 show the input signals INI and INQ as they are obtained in various instances, and the resulting clock and data bits on the other hand. FIG. 2 shows on the left hand side a Doppler signal in quadrature phase and of equal frequency wherein on each edge of INI and INQ, a "1" is shifted into the shift register. In fact the shift register content is maximized whenever all stages hold a "1". FIG. 2 shows on the right hand side an interference signal which may be out of phase signal or a in phase of the same frequency. Here then, for each edge (zero crossing) in one channel a "1" is produced with a signal edge, and the edge change that shortly follows thereafter. The other channel is interpreted as "0". The shift register content in this case covers only half of the number of shift register cells i.e. i=n/2.

FIG. 3 illustrates noise in a somewhat simplified version of the two center frequencies of the noise bands in the I and the Q channel. In each signal in the I channel and for the respective following edge in the Q channel a "1" is produced, but subsequently for the next change in InI and each subsequent change in InQ is interpreted as a zero. In the case the ratio of the center frequencies the average shift register content that obtains is equal to $i = 2n/v$. The actual near or average will be somewhat below that value since some of the frequency conditions will be violated. On the other hand the temporary shift register content may deviate considerably from the average corresponding to the statistics underlying the noise.

As can readily be seen from these example the hit/miss decision criteria must be positioned significantly above the average shift register content. Particularly in a small zone having only a few Doppler oscillations there may arise a confrontation with the hit/miss sensitivity. In this case one needs the amplitude branch as a corrective criteria so that on additional evaluating the amplitude of a channel the error hit situations are minimized. Here then we turn to the evaluation of the amplitude as far as the lower branch in FIG. 1 is concerned.

As stated the rectification by R is in fact an envelope detection and one uses as a criteria that the projectiles Doppler signal is, at least for a short time, definitely larger than the average value of noise. Also, that Doppler well above other possible, but rather small interefernce signal. Of course the interfering noise level is not a constant parameter and in order to offset this effect in accordance with the invention an adaptive threshold detection is used. Here then one uses as stated the rectifier for the Q doppler signal and from that two different averages are extracted: one with a large time constant that is the result of the TP3 10 mHz signal, and parallel thereto an average is produced but having a small time constant, by circuit TP 3 with a 300 Hz cut off level. Thus the output of TP3 produces in effect the average interfering noise level, and this particular filter will in effect suppress the projectile signal. On the other hand a doppler signal that is attirbutable to passing projectile will in fact appear only shortly but will provide temporarily a significant output by TP2; i.e. an output of TP2 that is considerably larger than the output of TP3, will appear. The two signals are compared in the circuit OA and if there is indeed sufficient difference, then this particular amplitude is deemed recognized as a hit signal and it is used as gating signal in the AND circuit of FIG. 1 accordingly.

As stated, and to be repeated briefly the various preparatory signal processing such as the amplification and the filtering and zero detection in the I and Q channels produce as stated Doppler signals InI and InQ, and their phase relation is indeed determined by the circuit which is in fact the composite of circuits CL-DAT, Sr and EV. The block CL-DAT produces data as well as clock signals to be used in the shift register SR and the output as stated is then used in the evaluating circuit EV. The output of the latter uses the amplitude detection output of OA as gating signal.

FIG. 4 illustrates a circuit by way of example as a position for producing the a clock signals CL. In other words FIG. 4 is a portion of the CL-DAT block and includes two D-type flip-flops DFF1 and DFF2 as well as two gates EXNOR1 and EXNOR2. The input for flip flop D-FF1 is the in phase channel signal InI (output of NDI-FIG. 1), and a local relatively high speed clock phi. The Q output of DFF2 and the $\bar{Q}$ output of DFF1 are combined in EXNOR1. The output of EXNOR1 is called INI' (which is one of the inputs of EXNOR2). EXNOR2 has as second input INQ' and that circuit is produced analogously by means of two flip flops and from the signal InQ. The output of EXNOR2 is the data clock Cl.

Figure 5:
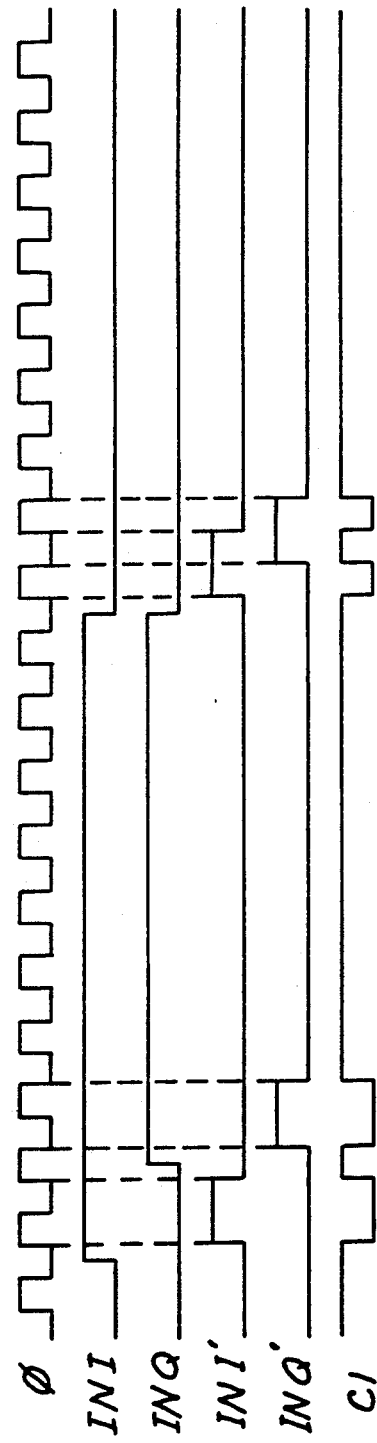
FIG. 5 is a signal diagram having import showing the production of the signal Cl in the circuit of FIG. 4.

FIG. 5 illustrates the signals as far as the circuit in FIG. 4 is concerned. Each signal edge of InI or InQ results in a pulse InI' and InQ' having width equal to the local clock period $\phi$. The signal InI is inputted for the positive edge of the local clock signal $\phi$, and the negative or trailing edge of clock signal $\phi$ is used to produce Cl on InQ. In this case simultaneous edges of InI and InQ one provides a temporal separation of the signals InI' and InQ'. Combining the signals in EXNOR R2 for the common clock signal CL is therefore an unambiguous undertaking.

Figure 6:
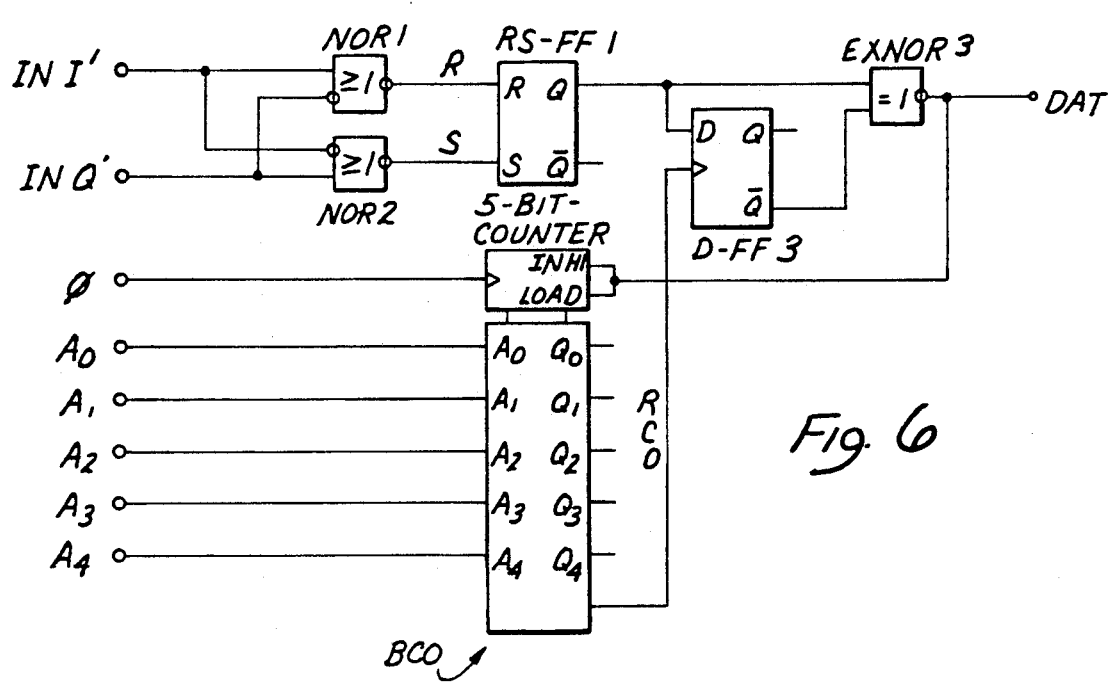
FIG. 6 is a circuit diagram for the production of the signal Dat in the component Cl-Dat of FIG. 1.
Figure 7:
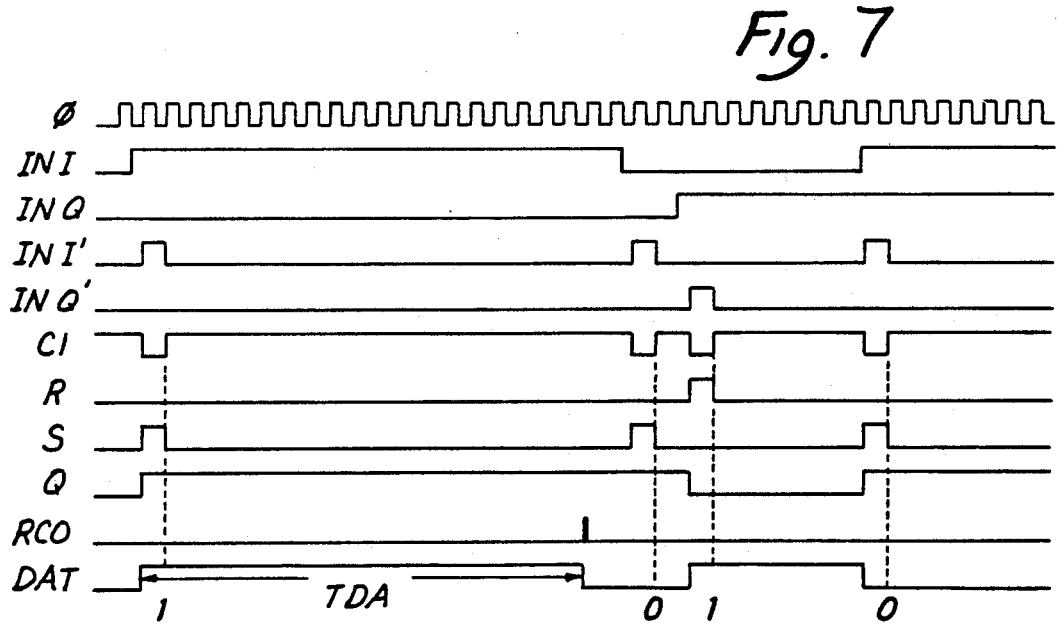
FIG. 7 is a signal diagram to explan how in FIG. 6 the signal Dat is produced.

FIG. 6 illustrates now the processing circuit for the production of the data signal Dat. For producing signal Dat as input data for the shift register SR one uses the two signals INI' and INQ' as per FIG. 4. FIG. 6 illustrates this inputting. The gates NOR1 and NOR2 serve for blocking from the circuit any not permitted state identified as $R = S = 1$ for the RS flip flop FF1. The corresponding signal traces of R and S are shown in FIG. 7. By means of a 5-bit count the adjustment of the time period tdA is givern by Tphi (32-A) wherein A is a 5-bit word given by A4, A3, A2, A1, A0. The time tdA therefore is that period of time in which the phase (phi) = 90 degrees is not satisfied. FIG. 7 illustrates this clearly.

Following each setting by $S = 1$ through the INI' input as well as resetting by $R = 1$ by INQ' the output of EXNOR3 produces a data bit of Dat = "1". This way starts a 5-bit counter BCO. Following the reaching of the maximum count state, RCO equals 1 and that results in Dat = 0. On the other hand if a setting or resetting of the RS flip-flops within the respective period of time tdA, then the signal Dat is immediately reset. As stated the clock signal CL and the data signal Dat are passed to the shift register SR for determining the respective input of 1 or 0 as the case may be at the given clock pulse rate of Cl.

The circuit EV is connected to the shift register SR and is provided in effect for determining the number of data bits of value 1 within all shift register stages and from a particular threshold on, the composite is deemed to indicate a "hit". The evaluation can be carried out in various ways. In an analog processing all outputs of all the shift register stages are fed to a summing point. The resulting voltage corresponds to the number I of occupied cells or stages so that there is a ratio determined as an analog signal $U/UO = i/n$. In an analog comparator with predetermined threshold one obtains the response accordingly.

Digital methods use the following steps. First the content of the shift register SR is summed by means of an adding circuit having n inputs of the same value. Then one may serially interrogate the shift register stages through a multiplexer having a sufficiently high frequency of operation as far as its clocking is concerned or one may ascertain the shift register content through up-counting or down-counting. The latter method is preferred and will be described in the following with reference to FIG. 8.

Figure 8:
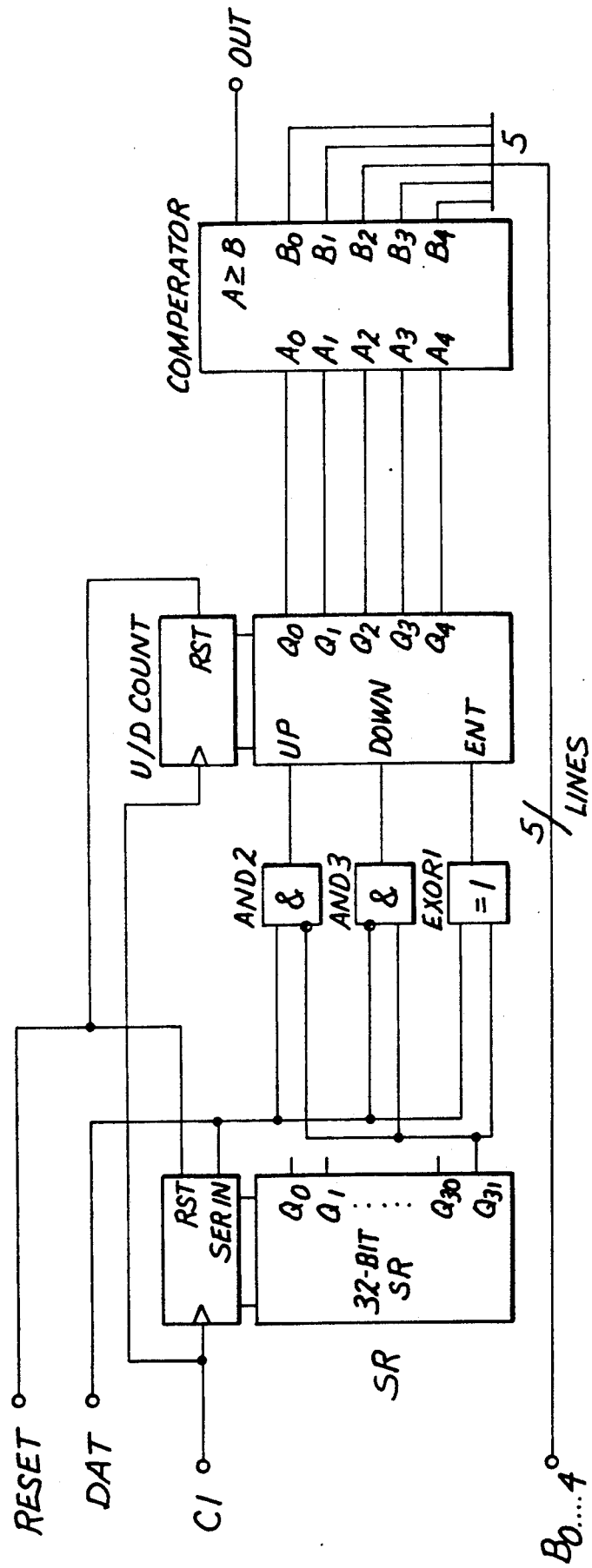
FIG. 8 illustrates a circuit diagram for the evaluation of signals using components in the circuits of FIG. 1 called SR and EV.

FIG. 8 illustrates particularly a circuit which includes a 32 bit shift register SR and a counter U/D count. Also included is a comparator. The initial condition of the shift register content as well as of the counter U/O count is deemed to be zero in all stages. This condition will be obtained by means of a reset circuit whenever there is an initialization procedure i.e. when the equipment is turned on or after each hit/miss decision. The counter registers the changes in the shift register content by comparing the value between a signal Dat and the respective value of the last shift register content. This comparison is carried out by means of the "and" gates AND2 and AND3 under exclusive utilization of the circuit EXOR1 output. The output signals of the three gates will program the counter as follows in accordance with the following table:

| Dat = 1 | Q31 = 0 | up = 1 |
| Dat = 0 | Q31 = 1 | down = 1 |
| Dat = 0 | Q31 = 1 | EnT = 1 |
| Dat = 1 | Q31 = 0 | EnT = 1 |

Fo each positive clock edge the value of Dat, whatever its value, (0 or 1) is inputted through the input SER in and the counter content in U/D count is changed in accordance with this program. The counterstate is then parallely inputted to the digital comparator and compared with an adjustable five bit threshold setting B0-B4. The output signal OUT is combined in the AND gate of FIG. 1 with the signal of the amplitude branch which was the lower branch in FIG. 1 in order to determine whether or not there was a hit or a miss. Of course, the hit signal may start another time count which will reset the entire circuit and keep it reset following the phase evaluation, so that a second detection of the same hit is avoided.

The invention is not limited to the embodiments described above but all changes and modifications thereof, not constituting departures from the spirit and scope of the invention, are intended to be included.

We claim:

1. A signal processing circuit for use in connection with a radar, sonic or ultrasonic locating ranging and distance measuring equipment, said equipment producing an in-phase Doppler signal and a quadrature phase Doppler signal received by said signal processing circuit comprising:
   an I channel and a Q channel;
   one of said channels including a low pass filter constructed as an integrator with a near constant 90° phase lag, the other one being a high pass filter constructed as a differentiator with a near constant 90° phase lead, whereby the limit and cut off frequency of the low pass filter is below and the limit and cut off frequency of the high pass frequency is above frequency of the range of Doppler signals; and
   means for determining the phase between the filtered I and Q signals being particularly responsive to a 90 degrees phase shift by counting those of the phase changes of I and Q signals zero which have a near 90° phase difference, and including means for determining a resulting count number in relation to a maximum number of possible phase changes for determining the passage of an object.

2. A signal processing circuit for use in connection with a radar, sonic or ultrasonic locating ranging and distance measuring equipment, said equipment producing an inphase Doppler signal and a quadrature phase Doppler signal received by said signal processing circuit comprising:
   an I channel and a Q channel;
   one of said channels including a low pass filter, the other one being a high pass filter, whereby the limit and cut off frequency of the low pass filter is below and the limit and cut off frequency of the high pass frequency is above frequency of the range of Doppler signals; and
   including a supplemental channel being responsive to at least one of said I and Q channel signals and including envelope detection of its amplitude, the supplemental channel including branches with different responses for noise and signals other than noise in order to determine whether or not an object was actually detected.

3. Apparatus as in claim 1 including in each of said channels a zero detector and circuit means for counting the zero detection.

4. A Doppler signal processing circuit comprising:
   an in phase channel and a quadrature phase channel;
   bandpass filters in each channel;
   a lowpass filter in one of said channels upstream from the respective bandpass filter;
   a highpass filter in another one of said channels upstream from the respective bandpass; each channel further including, downstream from the pass filters a zero detector;
   a clock circuit responding to the outputs of the zero detectors for the formation of a clock signal in response to each occurrence of a change in either of the channels;
   a data circuit connected to the zero detector output signals and further responding to the clock signal to provide data bits responding thereto; and
   an evaluating circuit responding to the sum total of phase changes in the I and Q zero detection which phase changes are particularly spaced in time, in order to establish a criteria for the passage of an object.

5. Circuit as in claim 4, including an envelope detector the output of which is being fed to two different lowpass filters the outputs of which are being fed to a comparator which makes an amplitude decision whether or not a signal should be registered as being attributable to a passing object.

* * * * *